US008456536B2

(12) United States Patent
Sugino et al.

(10) Patent No.: US 8,456,536 B2
(45) Date of Patent: Jun. 4, 2013

(54) IMAGE PROCESSING APPARATUS, IMAGE PROCESSING METHOD AND PROGRAM WITH SIGHTLINE DETECTION

(75) Inventors: Akinobu Sugino, Kanagawa (JP); Masaaki Tsuruta, Tokyo (JP); Nozomu Ozaki, Kanagawa (JP); Masamichi Asukai, Kanagawa (JP); Taiji Ito, Kanagawa (JP); Hidehiko Sekizawa, Tokyo (JP); Akane Sano, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 814 days.

(21) Appl. No.: 12/079,168

(22) Filed: Mar. 25, 2008

(65) Prior Publication Data

US 2008/0239092 A1  Oct. 2, 2008

(30) Foreign Application Priority Data

Mar. 26, 2007  (JP) ................. 2007-079856

(51) Int. Cl.
 *H04N 5/228* (2006.01)
(52) U.S. Cl.
 USPC .............. 348/222.1; 348/346; 348/208.14
(58) Field of Classification Search
 USPC ................. 348/222.1, 346, 208.14
 See application file for complete search history.

(56) References Cited

U.S. PATENT DOCUMENTS

| 4,901,096 A | 2/1990 | Lemelson |
| 5,463,443 A | 10/1995 | Tanaka et al. |
| 5,905,848 A | 5/1999 | Yano et al. |
| 5,923,908 A | 7/1999 | Schrock et al. |
| 6,677,969 B1* | 1/2004 | Hongo ............... 715/863 |
| 7,035,440 B2 | 4/2006 | Kaku |
| 7,596,307 B2 | 9/2009 | Tomita et al. |
| 7,711,253 B2 | 5/2010 | Tomita et al. |
| 2001/0010544 A1 | 8/2001 | Wakui |
| 2004/0130628 A1 | 7/2004 | Stavely |
| 2005/0046730 A1* | 3/2005 | Li .................. 348/333.12 |
| 2006/0165396 A1 | 7/2006 | Yamazaki |
| 2006/0171707 A1 | 8/2006 | Higuma |
| 2006/0228029 A1 | 10/2006 | Zhang et al. |

(Continued)

FOREIGN PATENT DOCUMENTS

| CN | 1812501 A | 8/2006 |
| JP | 63-053531 A | 3/1988 |

(Continued)

OTHER PUBLICATIONS

Hirasawa et al., "Development of Face Image Capturing System for Best Appearance—The Improvement of the Face Detection Algorithm", Institute of Electronics, Information and Communication Engineers Technical Study Reports, Japan, Corporate Judicial Person Institute of Electronics, Information and Communication Engineers, Nov. 11, 2004, vol. 104, No. 449, p. 61-66.

Newton, "Philosophiae Naturalis Principia Mathematica" 1687, p. 12-13, vol. 1, Royal Society, London.

*Primary Examiner* — Usman Khan
(74) *Attorney, Agent, or Firm* — Wolf, Greenfield & Sacks, P.C.

(57) ABSTRACT

The present invention provides an image processing apparatus that includes a sightline detection unit that detects the line of sight of a subject directed toward an imaging device in a captured image captured by the imaging device and containing at least one subject and a sightline indicating unit that clearly indicates, in correspondence to each subject, whether or not the line of sight of the subject directed toward the imaging device has been detected based upon sightline detection results provided by the sightline detection unit.

15 Claims, 7 Drawing Sheets

U.S. PATENT DOCUMENTS

| | | |
|---|---|---|
| 2006/0257026 A1* | 11/2006 | Shiffer et al. ................ 382/190 |
| 2007/0014543 A1 | 1/2007 | Nakase et al. |
| 2007/0076960 A1 | 4/2007 | Takamori et al. |
| 2008/0231714 A1 | 9/2008 | Estevez et al. |
| 2008/0273798 A1 | 11/2008 | Asukai et al. |
| 2008/0316339 A1 | 12/2008 | Sugino et al. |
| 2009/0016645 A1 | 1/2009 | Sako et al. |
| 2010/0066840 A1 | 3/2010 | Asukai et al. |

FOREIGN PATENT DOCUMENTS

| | | |
|---|---|---|
| JP | 03-092830 A | 4/1991 |
| JP | 05-142616 A | 6/1993 |
| JP | 06-030374 A | 2/1994 |
| JP | 07-043803 A | 2/1995 |
| JP | 07-218970 A | 8/1995 |
| JP | 08-110540 A | 4/1996 |
| JP | 10-048681 A | 2/1998 |
| JP | 11-174520 A | 7/1999 |
| JP | 11-205761 A | 7/1999 |
| JP | 2000-132693 A | 5/2000 |
| JP | 2001-197296 A | 7/2001 |
| JP | 2002-023716 A | 1/2002 |
| JP | 2002-049912 A | 2/2002 |
| JP | 2003-110999 A | 4/2003 |
| JP | 2004-062560 A | 2/2004 |
| JP | 2004-120404 A | 4/2004 |
| JP | 2004-134950 A | 4/2004 |
| JP | 2004-242360 A | 8/2004 |
| JP | 2005-110004 A | 4/2005 |
| JP | 2005-182526 A | 7/2005 |
| JP | 2005-303511 A | 10/2005 |
| JP | 3740351 B | 11/2005 |
| JP | 2005-352239 A | 12/2005 |
| JP | 2006-50163 A | 2/2006 |
| JP | 2006-197373 A | 7/2006 |
| JP | 2006-201531 A | 8/2006 |
| JP | 2006-202049 A | 8/2006 |
| JP | 2006-202181 A | 8/2006 |
| JP | 2006-203600 A | 8/2006 |
| JP | 2006-221378 A | 8/2006 |
| JP | 2006201531 A * | 8/2006 |
| JP | 2006203600 A * | 8/2006 |
| JP | 2006-279291 A | 10/2006 |
| JP | 2006-319610 A | 11/2006 |
| JP | 2006319610 A * | 11/2006 |
| JP | 2006-330800 A | 12/2006 |
| JP | 2006-331271 A | 12/2006 |
| JP | 2007-166542 A | 6/2007 |
| JP | 2007-249527 A | 9/2007 |

* cited by examiner

IMAGE PROCESSING APPARATUS, IMAGE PROCESSING METHOD AND PROGRAM WITH SIGHTLINE DETECTION

CROSS REFERENCES TO RELATED APPLICATIONS

The present invention contains subject matter related to Japanese Patent Application JP 2007-079856 filed in the Japan Patent Office on Mar. 26, 2007, the entire contents of which being incorporated herein by reference.

BACKGROUND OF THE INVENTION

1. Field of the Invention

The present invention relates to an image processing apparatus, an image processing method and a program.

2. Description of the Related Art

Apparatuses with imaging functions of capturing still images or dynamic images, which have come to be widely and commonly used in recent years, include digital cameras, digital video cameras such as the "Handycam" (trademark rights held by the applicant of the present invention) and portable telephones equipped with digital camera functions.

The technologies related to detection of human line of sight include that disclosed in patent reference literature 1.

(Patent reference literature 1) Japanese Laid Open Patent Publication No. 2006-202181.

SUMMARY OF THE INVENTION

When photographing a subject (person) in a still image (e.g., when taking a picture of the subject) with an apparatus having an imaging function in the related art described above, the subject may shift his line of sight just as the user of the apparatus equipped with the imaging function, having decided on the composition he likes, is about to take the picture, and, in such a case, the resulting image may not be what the user had in mind. In other words, the user of the apparatus equipped with the imaging function may not always be able to capture an image just when the subject's line of sight is directed toward the apparatus (i.e., a photo opportunity may be missed).

In addition, when a plurality of still images or a plurality of frames in a dynamic image have been photographed with an apparatus having an imaging function in the related art such as that described above, the photographer who has captured the images wants to select an image having been captured in which the subject's line of sight is directed toward the apparatus with the imaging function by checking the plurality of images one by one.

The present invention, having been completed by addressing the issues of the related art discussed above, provides a new and improved image processing apparatus, a new and improved image processing method and a new and improved program, with which a subject with his line of sight directed toward the imaging device and a subject with his line of sight not directed toward the imaging device can both be indicated.

According to an embodiment of the present invention, there is provided an image processing apparatus that includes a sightline detection unit that detects the line of sight of a subject directed toward an imaging device in a captured image captured by the imaging device and containing at least one subject and a sightline indicating unit that clearly indicates, in correspondence to each subject, whether or not the line of sight of the subject directed toward the imaging device has been detected based upon sightline detection results provided by the sightline detection unit.

The image processing apparatus includes the sightline detection unit and the sightline indicating unit. The sightline detection unit is capable of detecting the line of sight of each subject directed toward the imaging device in the captured image captured by the imaging device. The sightline indicating unit is capable of indicating, in correspondence to each subject, whether or not the line of sight of the subject has been detected based upon the subject sightline detection results provided by the sightline detection unit. The structure allows both a subject with his line of sight directed toward the imaging device and a subject with his line of sight not directed toward the imaging device to be indicated.

The image processing apparatus may further include a display unit that brings up on display an image with a clear indication as to whether or not the line of sight of the subject directed toward the imaging device has been detected, added therein by the sightline indicating unit.

The structure described above enables the user of the image processing apparatus to visually ascertain whether or not the line of sight of the subject in the captured image is directed toward the imaging device.

The image processing apparatus may further include a storage unit that holds an image with a clear indication as to whether or not the line of sight of the subject directed toward the imaging device has been detected, added therein by the sightline indicating unit.

This structure enables the user of the image processing apparatus to easily check the image with the line of sight of the subject indicated by the image processing apparatus at any time.

The sightline detection unit may detect a face area of each subject in the captured image, detect the line of sight of the subject directed toward the imaging device in correspondence to each face area having been detected and make a decision in correspondence to each subject as to whether or not the line of sight directed toward the imaging device has been detected.

In this case, subjects in the captured image are recognized and a decision as to whether or not the line of sight is directed toward the imaging device can be made in correspondence to each of the subjects having been recognized.

The sightline indicating unit may mark a face area over which the line of sight of the subject directed toward the imaging device has been detected by the sightline detection unit.

Since a subject with his line of sight directed toward the imaging device can be clearly indicated, a subject with his line of sight not directed toward the imaging device, too, can be indicated.

The sightline indicating unit marks the face area of the subject with the line of sight directed toward the imaging device by adding a rectangular frame indicating the face area to the captured image.

By adding such a mark, the subject with his line of sight directed toward the imaging device and the subject with his line of sight not directed toward the imaging device can be unequivocally distinguished from each other.

Alternatively, the sightline indicating unit may mark a face area where the line of sight of the subject directed toward the imaging device has not been detected by the sightline detection unit.

Since the subject with his line of sight not directed toward the imaging device can be clearly indicated, a subject with his line of sight directed toward the imaging device, too, can be indicated by the absence of a mark.

The image processing apparatus may further include an imaging unit constituting the imaging device and the captured image may be a preview image captured via the imaging unit.

The user of such an image processing apparatus is able to visually ascertain whether or not the line of sight of the subject is directed toward the imaging device in the preview image before the imaging device is engaged in actual photographing operation.

In addition, the imaging unit may execute a photographing operation if the number of lines of sight directed toward the imaging device, detected by the sightline detection unit is equal to or greater than a predetermined value.

With the image processing apparatus equipped with such an imaging unit, an image can be photographed at the very moment at which the predetermined number of lines of sight of subjects directed toward the imaging device is reached.

The image processing apparatus may further include a storage unit that holds an image having been previously captured by the imaging device and the captured image may be the image held in the storage unit.

In such a case, both a subject with his line of sight directed toward the imaging device and a subject with his line of sight not directed toward the imaging device can be indicated in the previously photographed image.

The captured image may be an image input from an external apparatus.

In such a case, both a subject with his line of sight directed toward the imaging device and a subject with his line of sight not directed toward the imaging device can be indicated in the image input from the external apparatus other than the image processing apparatus.

According to an embodiment of the present invention, there is provided an image processing method that includes steps of detecting a line of sight of a subject directed toward an imaging device in a captured image captured by the imaging device and containing at least one subject and indicating with clarity for each subject whether or not the line of sight of the subject directed toward the imaging device has been detected based upon sightline detection results provided through the detecting the line of sight of the subject directed toward an imaging device.

By adopting this method, both a subject with his line of sight directed toward the imaging device and a subject with his line of sight not directed toward the imaging device can be indicated clearly.

According to another embodiment of the present invention, there is provided a program enabling a computer to function as a sightline detector that detects a line of sight of a subject directed toward an imaging device in a captured image captured by the imaging device and containing at least one subject and an indicator that clearly indicates for each subject whether or not the line of sight of the subject directed toward the imaging device has been detected based upon sightline detection results provided by the sightline detector.

By using the program, both a subject with his line of sight directed toward the imaging device and a subject with his line of sight not directed toward the imaging device to be clearly indicated.

According to the embodiments of the present invention described above, a subject with his line of sight directed toward the imaging device and a subject with his line of sight not directed toward the imaging device can both be indicated with clarity.

DETAILED DESCRIPTION OF THE PREFERRED EMBODIMENTS

Figure 1:
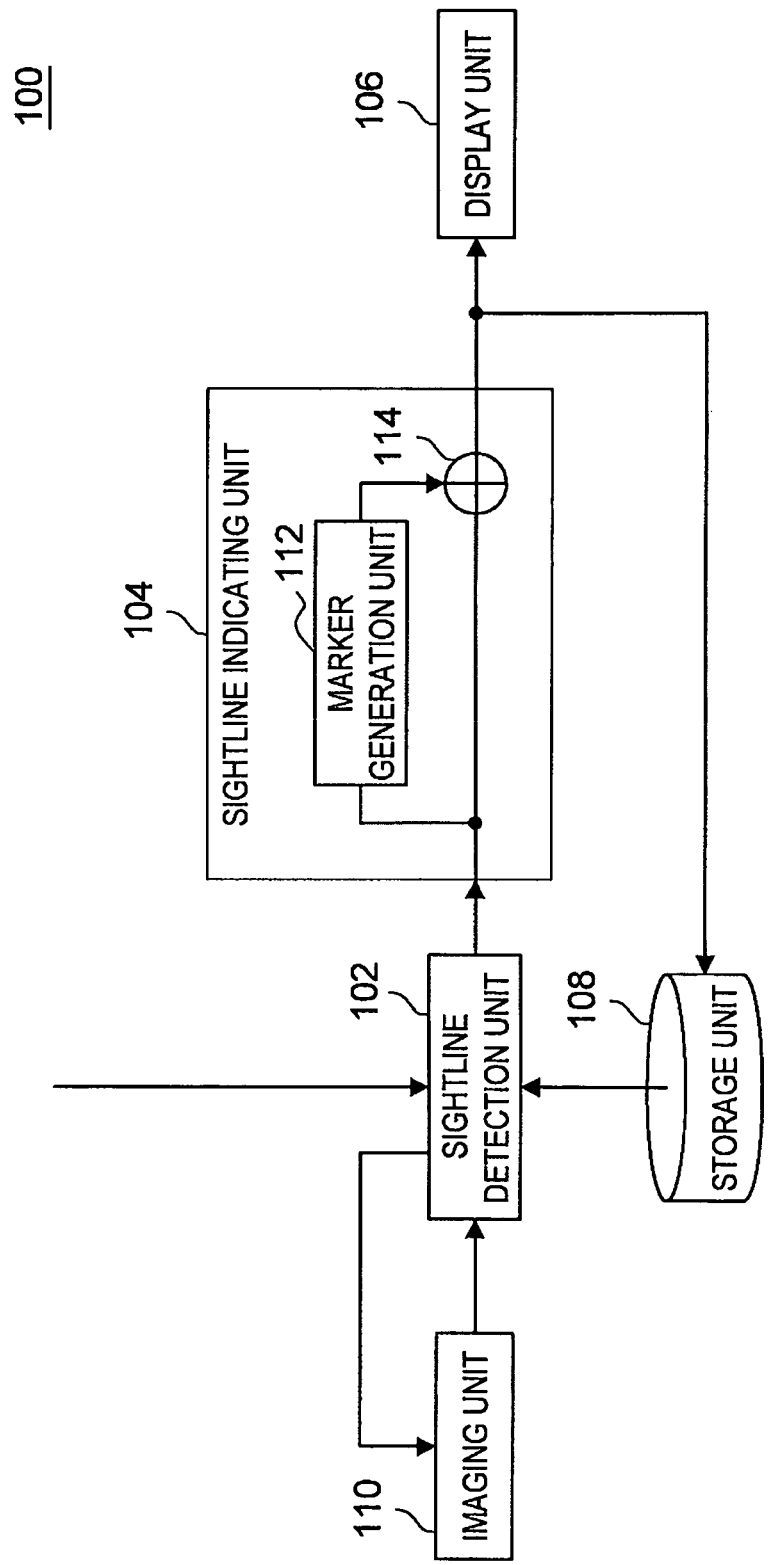
FIG. 1 is a block diagram of the image processing apparatus achieved in a first embodiment of the present invention.

Hereafter, preferred embodiments of the present invention will be described in detail with reference to the appended drawings. Note that in this specification and the appended drawings, structural elements that have substantially the same functions and structures are denoted with the same reference numerals and a repeated explanation of these structural elements is omitted.

First Embodiment

FIG. 1 is a block diagram of an image processing apparatus 100 achieved in the first embodiment of the present invention.

As shown in FIG. 1, the image processing apparatus 100 includes a sightline detection unit 102, a sightline indicating unit 104, a display unit 106, a storage unit 108 and an imaging unit 110. The image processing apparatus 100 may further include a control unit (not shown) constituted with, for instance, an MPU (micro processing unit) and the like, which controls the entire image processing apparatus 100, an operation unit (not shown) that can be operated by the user of the image processing apparatus 100, a decoding unit (not shown) that decodes data held in the storage unit 108, and the like.

The sightline detection unit 102 detects the line of sight of a subject contained in the captured image input thereto. It is to be noted that while the sightline detection unit 102 is capable of detecting the lines of sight of subjects in all captured images input thereto, the embodiment of the present invention is not limited to this example and the setting as to whether or not to detect the line of sight of the subject may be adjusted as necessary based upon an instruction issued via the operation unit (not shown) indicating whether or not to execute sightline detection. While the operation unit (not shown) may be, for instance, a button, a direction key, a rotary selector such as a jog dial or any combination of these, the present invention is not limited to such examples.

Figure 2:
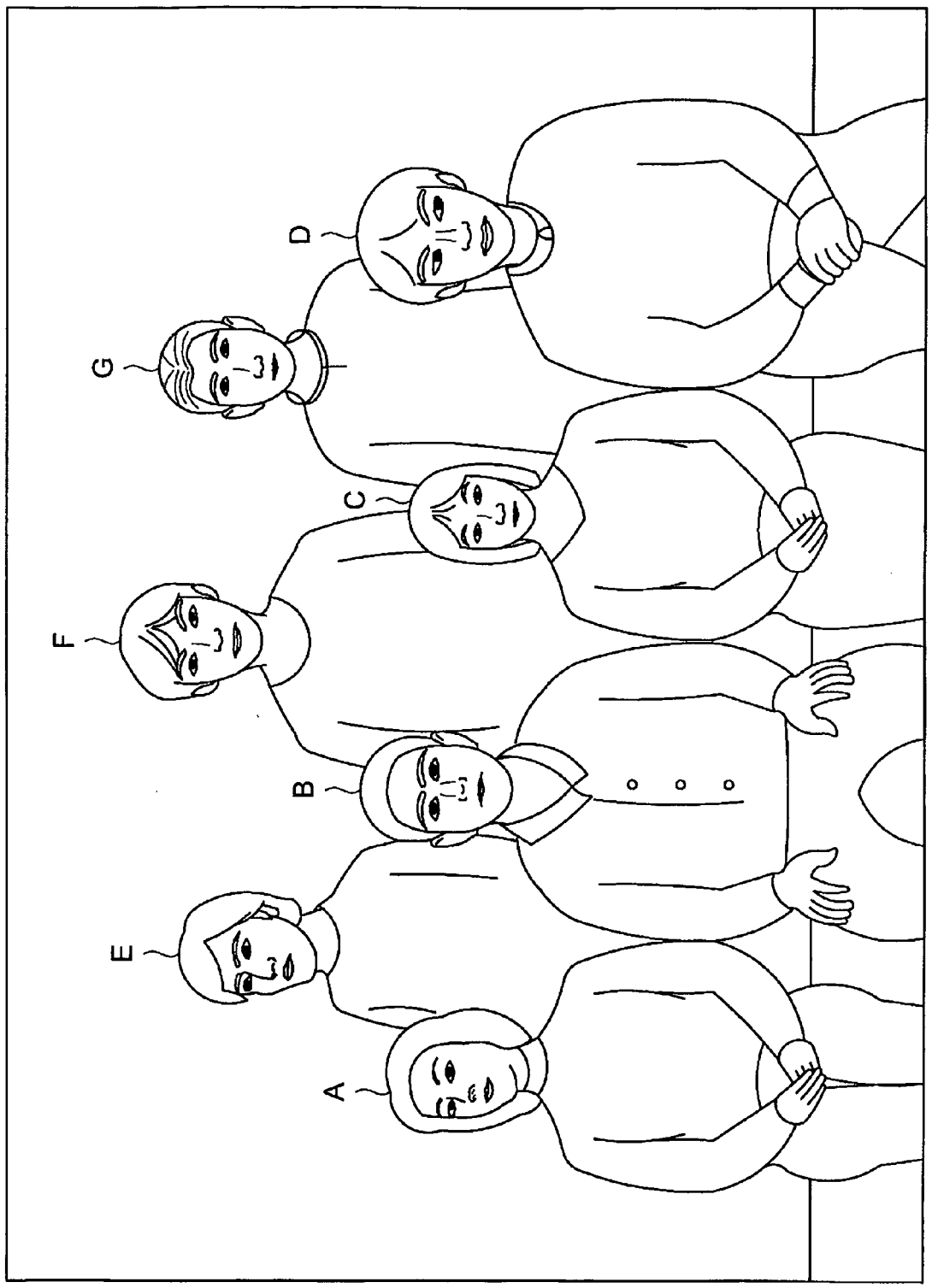
FIG. 2 presents an example of a captured image that may be used in the embodiment of the present invention.

The captured image input to the sightline detection unit 102 may be a preview image (i.e., an image captured prior to the actual photographing operation) captured via the imaging unit 110, an image held in the storage unit 108 (i.e., a previously photographed image) or an image input from an external apparatus other than the image processing apparatus 100. It is to be noted that the captured image input to the sightline detection unit 102 may be a still image or a dynamic image (a dynamic image can be handled as still images each corresponding to a given frame). FIG. 2 presents an example of the captured image that may be used in the embodiment of the present invention. The image in FIG. 2 contains seven human subjects A through G.

The line of sight detected by the sightline detection unit 102 may be a line of sight directed toward the imaging device having captured the image. In such a case, the line of sight of the subject extends to the front (i.e., toward the imaging device) in the captured image. It is to be noted that the line of sight that can be detected by the sightline detection unit 102 in the embodiment of the present invention is not limited to the line of sight directed toward the imaging device and instead, a line of sight of a subject extending along the direction forming a specific angle relative to the front in the captured image may be detected. The following explanation is given by assuming that the sightline detection unit 102 detects the line of sight directed toward the imaging device.

The subjects A through G in the captured image shown in FIG. 2 and the orientations of the subjects' faces have the following relationships.

(1) The line of sight directed toward the front and the face oriented toward the front: subjects B, C, F and G (2) The line of sight directed to the front and the face oriented along a direction other than the frontward direction: subject A (3) The line of sight extending along a direction other than the frontward direction and the face oriented to the front: subject D (4) The line of sight extending along a direction other than the frontward direction and the face oriented along a direction other than the frontward direction: subject E Namely, the captured image shown in FIG. 2 includes the subjects A through C, F and G with their lines of sight directed toward the imaging device and the subjects D and E with their lines of sight not directed toward the imaging device.

Accordingly, the sightline detection unit 102 detecting the directions of the lines of sight of the subjects A through G in the captured image in FIG. 2 input thereto judges that lines of sight (toward the imaging device) are present in correspondence to the five subjects A through C, F and G and judges that there are no lines of sight (directed toward the imaging device) in correspondence to the subjects D and E. The following is an explanation of the sightline detection method adopted in the embodiment of the present invention.

(Sightline Detection Method)

Figure 3:
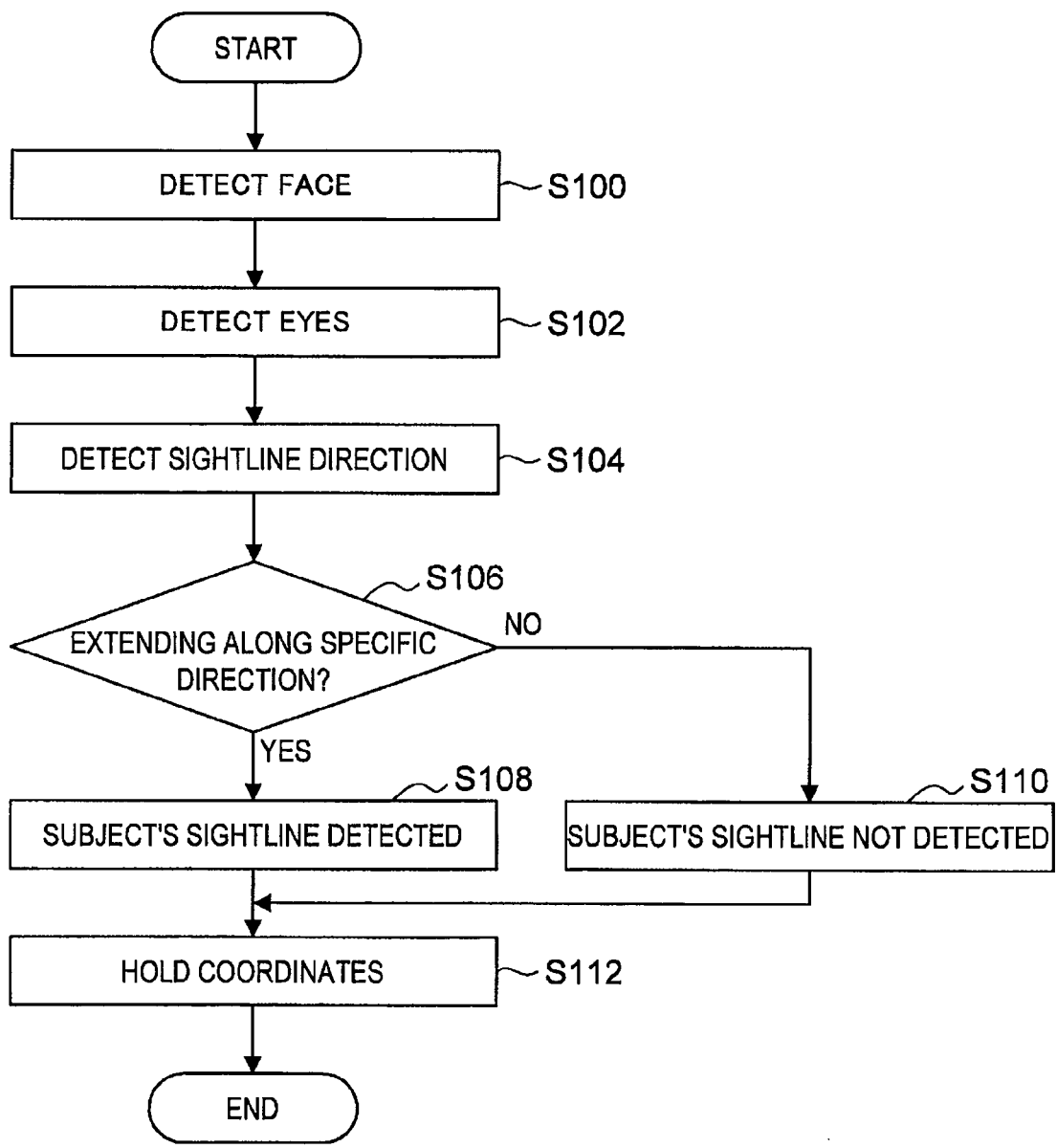
FIG. 3 presents a flowchart of an example of a sightline detection method that may be adopted in the embodiment of the present invention.

FIG. 3 presents a flowchart of an example of a sightline detection method that may be adopted in the embodiment of the present invention. It is to be noted that the sightline detection in FIG. 3 is executed repeatedly a number of times matching the number of subjects in the captured image.

The face of the subject is first detected and an area containing the subject's face (hereafter referred to as a "face area") is determined (S100). The subject's face area may be determined in step S100 by, for instance, detecting an area indicating a pattern similar to a face brightness distribution pattern and a face structure pattern. It is to be noted that the data such as the data indicating the face brightness distribution pattern and the face structure pattern used to determine the face area in step S100, may be held in, for instance, the storage unit 108 or may be obtained from an external apparatus via a communication unit (not shown) of the image processing apparatus 100. However, the present invention is not limited to these examples. Although not shown in FIG. 3, if no face area can be determined in a given captured image, the processing for the particular captured image may end without executing the processing in step S102 and subsequent steps.

In addition, if the captured image is a dynamic image, the subject face area may be determined in step S100 by detecting a moving object based upon the difference between the current frame and the immediately preceding frame and determining the head area of the moving object.

The eyes are detected in the face area having been determined in step S100 (S 102). The eyes may be detected in step S102 based upon, for instance, the brightness distribution in the face image area having been determined in step S100.

The direction along which the line of sight of the subject extends is detected based upon the subject's eye area having been detected in step S102 (S104). The sightline direction detection in step S104 may be executed by, for instance, ascertaining the ratio of the area of the whites of the eyes and the area of the irises. It will be obvious that the sightline direction detection in step S104 does not need to be executed in conformance to a uniform criterion and that the detection criterion may be adjusted in correspondence to, for instance, the tilt of the subject's face.

A decision is then made as to whether or not the line of sight of the subject having been detected in step S104 extends along a specific direction (S106). The specific direction may be the direction towards the imaging device (i.e., the frontward direction). Namely, if the direction toward the imaging device is designated as the specific direction and the line of sight of the subject having been detected in step S104 is judged to extend along the specific direction, the line of sight of the subject is directed toward the imaging device. However, it will be obvious that the specific direction designated in the embodiment of the present invention is not limited to the direction toward the imaging device and that any direction may be designated as the specific direction.

If it is decided in step S106 that the line of sight of the subject extends along the specific direction, it is judged that the subject's sightline has been detected (S108) and coordinates are held (S112). While the results of the decision made in step S108 may be expressed as 1-bit data (i.e., the decision results are indicated by a value of either "0" or "1"), the decision results may be expressed by data other than 1-bit data. In addition, the coordinates held in step S112 may be, for instance, the coordinates of four points at the four corners of a rectangular face area containing the subject's face, relative to the origin point assumed at an arbitrary point in the captured image. The size of the rectangular face area containing the face may be determined by using, for instance, a table indicating a correspondence between the face size and the rectangular face area size. Alternatively, the size of the rectangular face area may be set so as to range outward beyond the face by a specific extent. In addition, the size of the rectangular face area containing the face may be specified via the operation unit (not shown). It is to be noted that the coordinates held in step S112 may be the coordinates of a characteristic point such as an eye or the mouth of the subject.

While the coordinates or the like may be held at, for instance, a storage device of the sightline detection unit 102 in step S112, the present invention is not limited to this example and they may be held in the storage unit 108. While the storage device of the sightline detection unit 102 may be, for instance, a magnetic recording medium such as a hard disk or a nonvolatile memory such as a flash memory, a storage device other than these may be used instead. The following explanation is given by assuming that the coordinate data are held in step S112 at the sightline detection unit 102.

In addition, while the results of the decision made in step S108 or S110 and the coordinates data held in step S112 may be stored as data separate from the captured image data as described above, the embodiment of the present invention is not limited to this example. The decision results and the coordinates may be appended to the captured image as tag information or they may be appended to the captured image through digital watermarking.

If it is decided in step S106 that the line of sight of the subject does not extend along the specific direction, it is judged that the subject's sightline has not been detected (S110) and the coordinates are held (S112). The results of the decision made in step S110 may be expressed as, for instance, 1-bit data assuming a value which is the inverse of the value of the data indicating the results of the decision made in step S108.

The sightline detection unit 102 executes the sightline detection shown in FIG. 3 multiple times and thus detects the line of sight of each subject in the captured image containing a plurality of subjects.

(Variation of Sightline Detection)

It is to be noted that while the coordinates are held (step S112) both when it is judged that the subject's sightline has been detected (step S108) and when it is judged that the subject's sightline has not been detected (step S110) in the sightline detection method shown in FIG. 3, the sightline detection method achieved in the embodiment of the present invention is not limited to this example and the coordinates may instead be held only either when it is judged that the subject's sightline has been detected or when it is judged that the subject's sightline has not been detected. It is to be noted that if the coordinates are to be held only either when it is judged that the subject's sightline has been detected or when it is judged that the subject's sightline has not been detected, the data to be used to distinguish the affirmative/negative detection judgment with regard to the line of sight of the subject do not need to be stored.

To continue with the description of the image processing apparatus 100 in reference to FIG. 1, the sightline indicating unit 104, which includes a marker generation unit 112 and an image synthesizing unit 114, edits the captured image input to the sightline detection unit 102 to indicate the line of sight of each subject based upon the sightline detection results for each subject provided by the sightline detection unit 102 (e.g., the results of the decision made in step S108 or step S110 and the coordinates held in step S112). It will be obvious that if no sightline detection results are transmitted from the sightline detection unit 108, the sightline indicating unit 104 does not need to execute the processing for indicating the sightline for each subject. Under such circumstances, the sightline indicating unit 104 will simply output the captured image that has been input thereto.

The marker generation unit 112 may generate, for instance, a rectangular frame (marker) to enclose the face area of a subject the line of sight of which is not directed toward the imaging device. It is to be noted that the marker generated by the marker generation unit 112 does not need to be a rectangular frame and instead, a "+" mark may be appended to a characteristic point such as an eye or mouth of the subject or an icon indicating that the line of sight of the subject is not directed toward the imaging device may be appended. In addition, the marker generation unit 112 is able to determine the size of the marker to be generated based upon the coordinate data held at the sightline detection unit 102.

The image synthesizing unit 114 marks the captured image by combining the marker having been generated by the marker generation unit 112 with the captured image. The position at which the marker is incorporated with the captured image by the image synthesizing unit 114 may be determined based upon the coordinate data held at the sightline detection unit 102.

Figure 4:
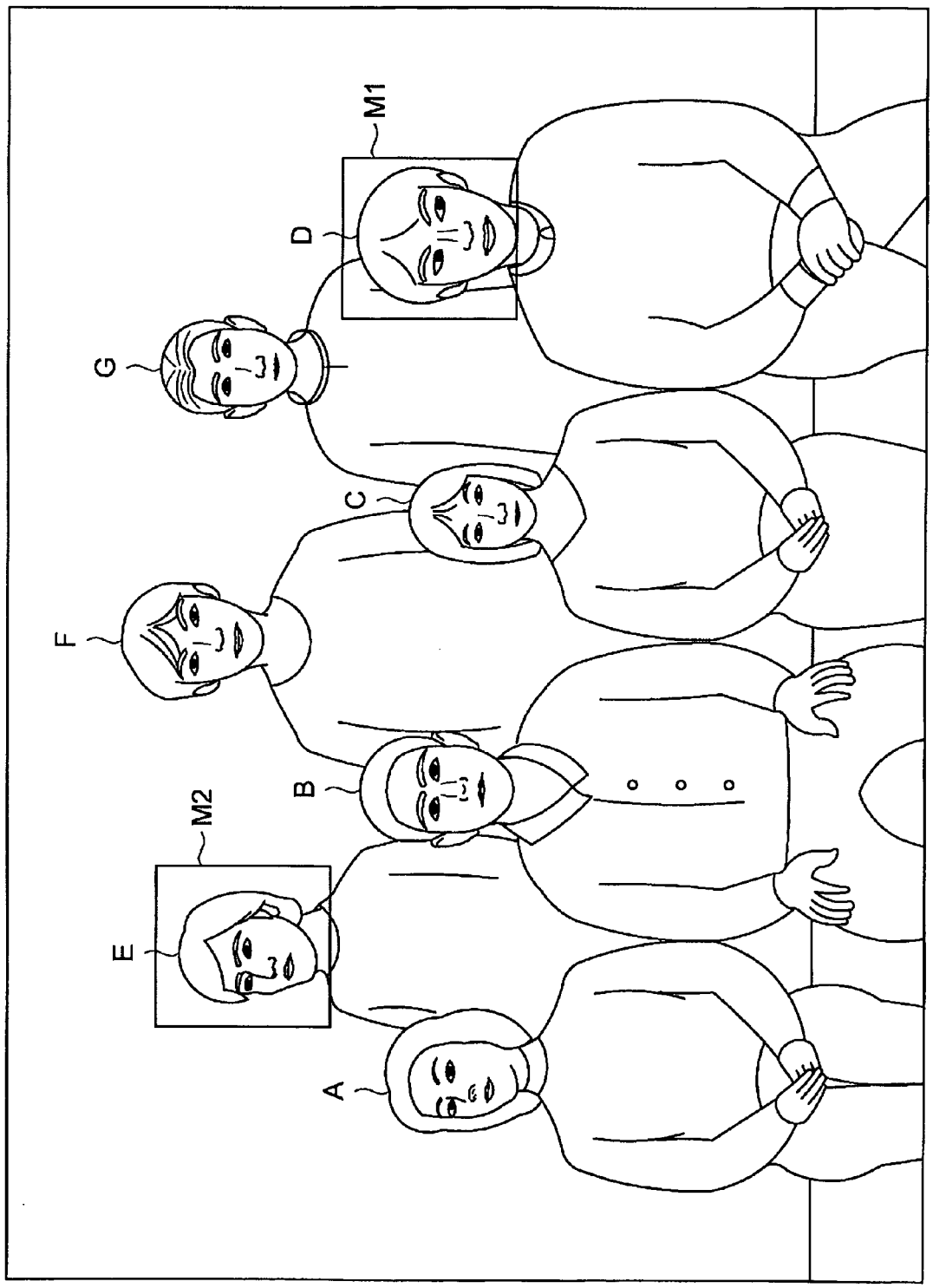
FIG. 4 presents an example of an image generated by indicating sightlines in the captured image shown in FIG. 2.

FIG. 4 presents an example of an image with sightlines indications added into the captured image shown in FIG. 2. FIG. 4 presents an example of an image indicating the subjects, the lines of sight of which are not directed toward the imaging device, with rectangular markers M1 and M2 appended to the subjects D and E, the lines of sight of which are not directed toward the imaging device. It is to be noted that while FIG. 4 shows markers added to the subjects, the lines of sight of which are not directed toward the imaging device, the embodiment of the present invention is not limited to this example and a marker may be appended to each subject the line of sight of which is directed toward the imaging device or different markers may be appended to a subject, the line of sight of which is not directed toward the imaging device and a subject, the line of sight of which is directed toward the imaging device.

In other words, the "clear sightline indication for each subject" may be provided in the embodiment of the present invention as a marker appended to either a subject with a sightline directed toward the imaging device or a subject with a sightline not directed toward the imaging device, so as to the visually distinguish, for instance, a marked subject as one with the sightline not directed toward the imaging device from an unmarked subject with the sightline directed toward the imaging device as shown in FIG. 4, while the sightline indications may instead be provided as indicators appended to both a subject with a sightline not directed toward the imaging device and a subject with a sightline directed toward the imaging device (e.g., different markers appended to a subject with a sightline not directed toward the imaging device and a subject with a sightline directed toward the imaging device).

At the display unit 106, which is a display device constituting part of the image processing apparatus 100, the image output from the sightline indicating unit 104 (i.e., the captured image or the marked image) can be displayed. While the display unit 106 may be, for instance, an LCD (liquid crystal display), an OLED (organic light emitting diode display; may be otherwise referred to as an organic EL display (organic electroluminescence display)), or an FED (field emission display), the structure that may be adopted in the display unit is not limited to these examples.

In the storage unit 108, which is a storage device constituting part of the image processing apparatus 100, a previously photographed image or an image output from the sightline indicating unit 104 can be held. While the storage unit 108 may be a magnetic recording medium such as a hard disk or magnetic tape, a non-volatile memory such as a flash memory, an MRAM (magnetoresistive random access memory), an FeRAM (ferroelectric random access memory), a PRAM (phase change random access memory), or a magneto-optical disk, it will be obvious that the storage unit may adopt a structure other than these.

The imaging unit 110 is an imaging device that includes a lens and an image sensor such as a CCD (charge coupled device) or a CMOS (complementary metal oxide semiconductor). The imaging unit 110 may be further equipped with a signal processing device at includes an AGC (automatic gain control) circuit and an ADC (analog to digital converter) and converts analog signals generated that the image sensor to digital signals. Such a signal processing device may execute white balance correction processing, interpolation processing, color tone correction processing, gamma control processing, YCbCr conversion processing, edge emphasis processing, JPEG coding processing and the like and thus may convert the image to data assuming a format optimal for display at the display unit 106 and/or storage in the storage unit 108.

Through the white balance correction processing, predetermined gains are each applied to one of the three color components R, G and B (red, green and blue) in the raw image data (the captured image yet to undergo signal processing) so as to amplify the pixel values at the individual pixels. Through interpolation processing, full RGB data are generated for all the pixels disposed in, for instance, a Bayer array. The color tone of the image may be corrected through, for instance, color tone correction processing. The gamma control processing may be executed to assure visual linearity by, for instance, non-linearly converting the R, G and B signals. The RGB data are converted to YCbCr data based upon, for instance, a specific conversion expression through the YCbCr conversion processing. Y, Cb and Cr respectively represent the brightness (luminance), a color difference (chrominance) and a color difference (chrominance). An edge area in the image may be detected and the variable density in the image may be emphasized by raising the brightness of the detected edge area through the edge emphasis processing. Through the JPEG coding processing, the image is converted to an image file adopting the JPEG (Joint Photographic Experts Group) format.

The imaging unit 110 is also capable of automatically executing a photographing operation by using the results of sightline detection executed for each subject by the sightline detection unit 102. The detection results provided to the imaging unit 110 by the sightline detection unit 102 may be a value indicating the total number of subjects whose sightline has been detected. In such a case, the imaging unit 110 automatically executes photographing operation when, for instance, the total value is equal to or greater than a predetermined value. It is to be noted that the predetermined value may be held in a storage device of the imaging unit 110 or in the storage unit 108. While the storage device in the imaging unit 110 may be a magnetic recording medium such as a hard disk or a nonvolatile memory such as a flash memory, it may adopt a structure other than these.

As described above, the image processing apparatus 100 achieved in the first embodiment of the present invention, which is equipped with the sightline detection unit 102, is capable of detecting the line of sight of each subject directed toward the imaging device in a captured image input to the sightline detection unit 102. In addition, the image processing apparatus 100 further includes the sightline indicating unit 104, which visually indicates the line of sight of each subject by, for instance, marking a subject, the line of sight of which has been judged to have been undetected based upon the sightline detection results provided in correspondence to the individual subjects by the sightline detection unit 102.

Since the sightline affirmative/negative detection judgment results can be clearly indicated in correspondence to each subject in the captured image via the image processing apparatus 100, the user of the image processing apparatus 100 is able to visually ascertain whether or not the line of sight of a given subject in the captured image is directed toward the imaging device.

If the captured image to undergo the processing in the image processing apparatus 100 (i.e., the captured image input to the sightline detection unit 102) is a preview image, the user first visually ascertains whether or not the line of sight of the subject is directed toward the imaging device and then performs the actual photographing operation (e.g., the user presses down the shutter button constituting the operation unit so as to transmit a photographing instruction to the imaging unit 110). The image processing apparatus, unlike an apparatus equipped with an imaging function in the related art, allows the user to obtain the desired image without missing the moment (the photo opportunity), in which the line of sight of the subject is directed toward the imaging device. In addition, the user photographing a group photo such as that shown in FIG. 2 is able to visually confirm in the preview image whether or not the lines of sight of the subjects are directed toward the imaging unit 110 constituting the imaging device. In other words, any subject, the line of sight of which is not directed toward the imaging device can be easily ascertained.

Furthermore, the image processing apparatus 100 is able to automatically execute a photographing operation as the number of lines of sight directed toward the imaging device becomes equal to or greater than the predetermined value based upon the sightline detection results provided in correspondence to each subject by the sightline detection unit 102. The image processing apparatus 100, unlike an apparatus equipped with an imaging function in the related art, allows the user to obtain the desired image without missing the moment (the photo opportunity), in which the lines of sight of the subjects are directed toward the imaging device.

The captured image processed in the image processing apparatus 100 does not need to be a preview image and instead, an image held in the storage unit 108 (i.e., a previously photographed image) or an image input from an external apparatus other than the image processing apparatus 100 (i.e., an image having been photographed at the external apparatus) may be processed in the image processing apparatus 100 as the captured image. The image processing apparatus 100 is capable of detecting the line of sight of each subject in a previously photographed image as well. Thus, based upon the sightline detection results, the image processing apparatus 100 is able to select an image with the line of sight of the subject directed toward the apparatus equipped with the imaging function, from a plurality of still photographic images or a plurality of frames in a dynamic image.

While the image processing apparatus 100 has been described as the first embodiment of the present invention, the first embodiment of the present invention is not limited to the particular image processing apparatus, and it may be adopted in any type of apparatus equipped with an imaging function for capturing still images or dynamic images, including a digital camera, a digital video camera such as the "Handycam" the trademark rights to which are held by the applicant of the present invention, or a portable telephone with a digital camera function.

Program Achieved in the First Embodiment

A program may be written to enable a computer to function as the image processing apparatus 100 in the first embodiment and based upon such a program, a subject, the line of sight of which is directed toward the imaging device and a subject, the line of sight of which is not directed toward the imaging device in the captured image can be clearly indicated.

Second Embodiment

The image processing apparatus 100 achieved in the first embodiment detects the line of sight of each subject directed toward the imaging device and adds, for instance, a mark to the captured image so as to clearly indicate whether or not the line of sight of the subject directed toward the imaging device has been detected. However, the image processing apparatus that may be achieved in an embodiment of the present invention is not limited to that described above. Accordingly, the image processing apparatus achieved in the second embodiment of the present invention is now explained.

Figure 5:
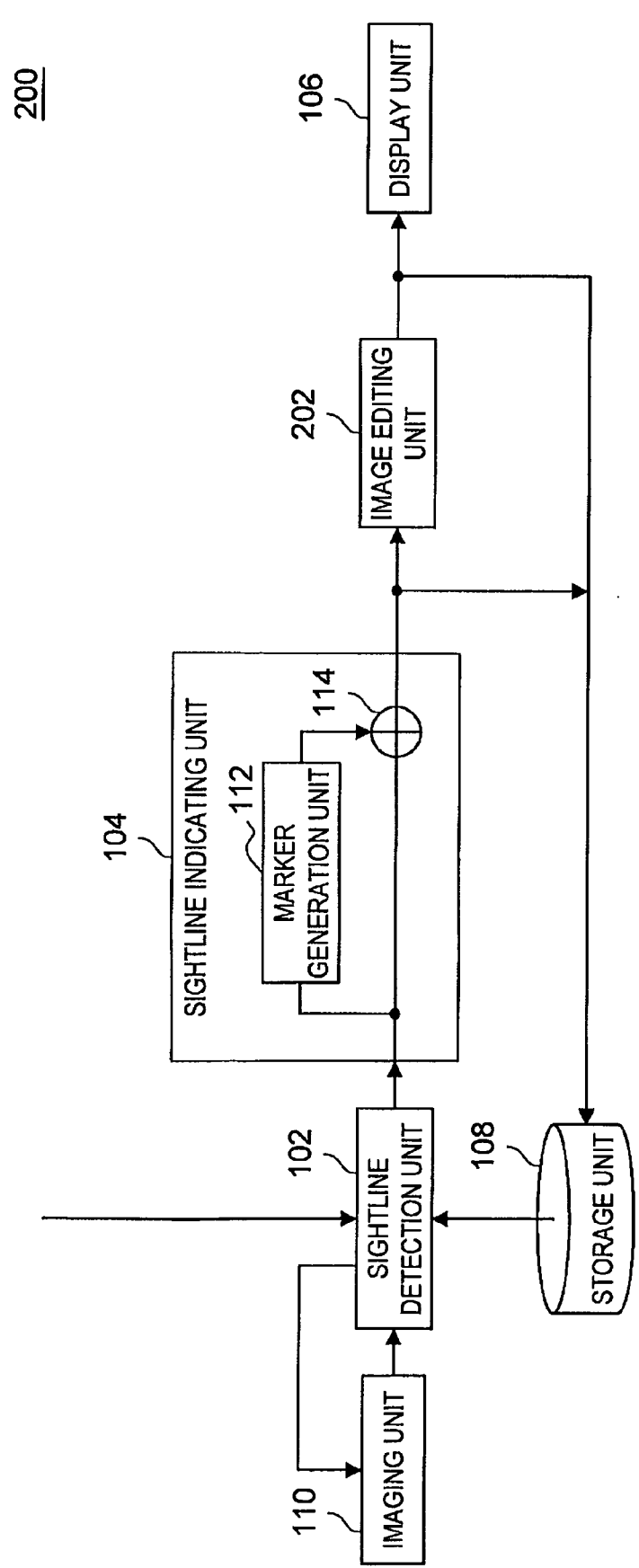
FIG. 5 is a block diagram of the image processing apparatus achieved in a second embodiment of the present invention.

FIG. 5 is a block diagram of an image processing apparatus 200 achieved in the second embodiment of the present invention.

The image processing apparatus 200 in the second embodiment shown in FIG. 5 basically adopts a structure similar to that of the image processing apparatus 100 achieved in the first embodiment of the present invention. It differs from the image processing apparatus 100 in that it further includes an image editing unit 202 installed at a stage to the rear of the sightline indicating unit 104.

The image editing unit 202 edits an image input thereto, thereby generating an edited image. Examples of image editing that may be executed in the image editing unit 202 are described below.

(First Example of Image Editing that may be Executed in the Image Editing Unit 202: Face Image Generation)

The image editing unit 202 is capable of generating a face image by slicing out an image from the captured image based upon the sightline detection results provided in correspondence to each subject by the sightline detection unit 102. FIG. 6 illustrates the first example of image editing executed by the image editing unit 202 according to the present invention.

Figure 6A:
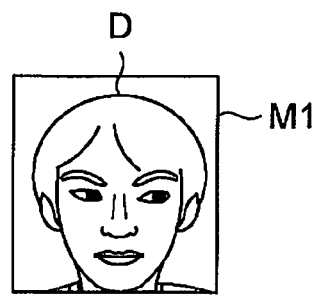
FIG. 6 presents a first example of image editing executed by the image editing unit according to the present invention.
Figure 6B:
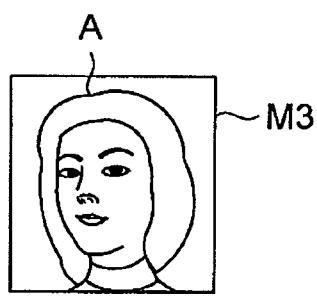

FIG. 6(a) shows a face image of the subject D, the line of sight of which has been judged not to be directed toward the imaging device by the sightline detection unit 102 and FIG. 6(b) shows a face image of the subject A, the line of sight of which has been judged to be directed toward the imaging device by the sightline detection unit 102. As has been explained in reference to the image processing apparatus 100 and the sightline detection method in FIG. 3 achieved in the first embodiment, the sightline detection unit 102 in the embodiments of the present invention is capable of judging in correspondence to each subject whether or not the sightline is directed toward the imaging device. Accordingly, by using, for instance, the coordinate data held at the sightline detection unit 102, the image editing unit 202 is able to generate face images by slicing out from the captured image face areas of subjects, the lines of sight of which are not directed toward the imaging device and/or face areas of subjects with lines of sight directed toward the imaging device.

When the imaging unit 110 is equipped with a wide-angle lens to be used to generate a captured image over a wide range, the captured image is bound to be distorted. Since the adverse effect of the wide-angle lens does not manifest to a significant extent over a central area of the captured image (i.e., the central area of the captured image is not distorted to a significant extent), the image editing unit 202 may generate a face image by executing slice-out processing (trimming) so as to slice out at least an image portion from the captured image over the central area. In the peripheral area of the captured image where the adverse effect of the wide-angle lens manifests to a significant extent (i.e., where the image is significantly distorted), only a distorted face image can be obtained via the image editing unit 202 if the image editing unit 202 simply executes the slice-out processing.

Accordingly, the image editing unit 202 has a function that enables it to execute distortion correction processing on the face image generated through the slice-out processing in correspondence to the slice-out position at which the face image is sliced out identified based upon, for instance, the coordinate data held at the sightline detection unit 102. It is to be noted that the distortion correction processing may be executed by, for instance, stretching the face image having been generated through the slice-out processing along the horizontal direction and/or the vertical direction, thereby correcting the face image having been generated through the slice-out processing to a rectangular image and then by restoring the symmetry of the face image in correspondence to the degree to which it has been stretched both along the horizontal direction and the vertical direction. However, it will be obvious that the distortion correction processing is not limited to this example and any method that enables image distortion correction may be adopted.

Figure 6C:
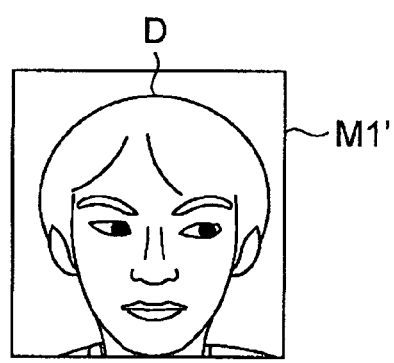
Figure 6D:
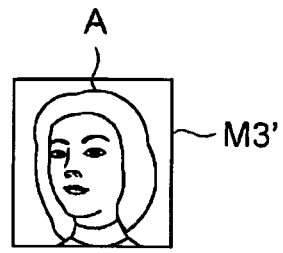

In addition, the image editing unit 202 is capable of adjusting (resizing) the generated face image to any size. FIG. 6(c) shows a face image M1' obtained by enlarging the face image in FIG. 6(a), whereas FIG. 6(b) shows a face image M3' obtained by reducing the face image in FIG. 6(b). Since the image editing unit 202 is able to generate a face image by correcting the image distortion, a face image in a desired size can then be generated by multiplying the horizontal measurement and the vertical measurement of the generated face image by a single value (i.e., the ratio of the horizontal measurement and the vertical measurement remains unchanged).

As described above, the image editing unit 202 is capable of generating a face image based upon the sightline detection results provided in correspondence to each subject by the sightline detection unit 102. Accordingly, the generated face image may be displayed separately from, for instance, the image having been marked by the sightline indicating unit 104 so as to enable the user of the image processing apparatus 200 to visually ascertain whether or not the line of sight of the subject in the captured image is directed toward the imaging device. When the captured image includes numerous subjects in particular, the size of the face area of each subject may be rather small. Even under such circumstances, the user is able to determine with ease any subject, the line of sight of which is not directed toward the imaging device by adopting the first example of image editing in the image editing unit 202.

(Second Example of Image Editing that may be Executed in the Image Editing Unit 202: Incorporating the Generated Face Image into the Captured Image)

Figure 7:
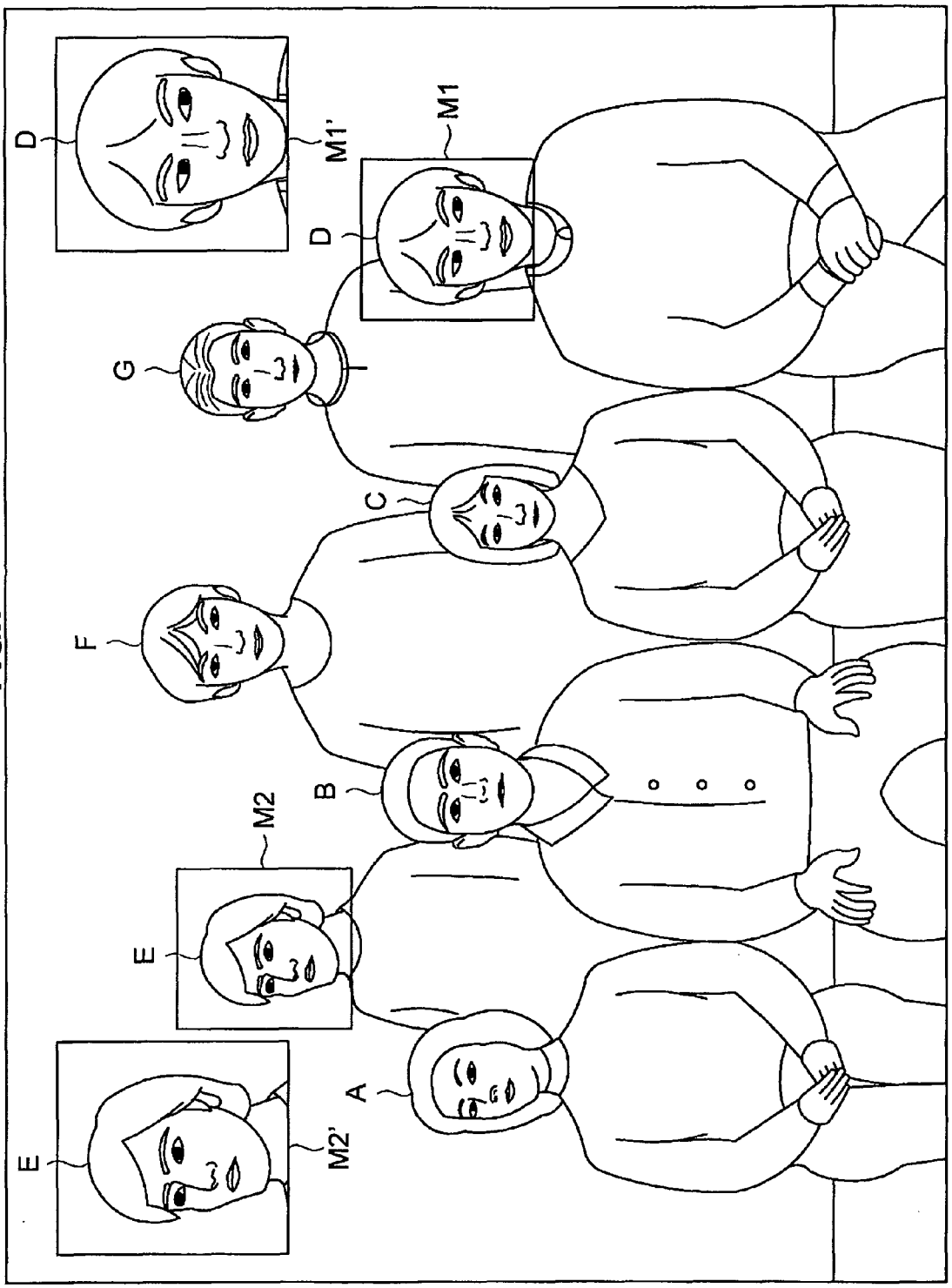
FIG. 7 presents a second example of image editing executed by the image editing unit according to the present invention.

A face image generated (as in the first image editing example) by the image editing unit 202, may then be incorporated into the image having been marked by the sightline indicating unit 104. FIG. 7 illustrates the second example of image editing that may be executed in the image editing unit according to the present invention.

FIG. 7 shows an image representing an example of image editing executed in the image editing unit 202 obtained by incorporating face images M1' and M2' of the subjects D and E, the lines of sight of which are not directed toward the imaging device. As explained earlier, the sightline detection unit 102 is capable of holding the coordinate data corresponding to the face areas of both a subject, the line of sight of which is not directed toward the imaging device and a subject, the line of sight of which is directed toward the imaging device. Thus, by using, for instance, the coordinate data held at the sightline detection unit 102, the image editing unit 202 is able to synthesize an image by adding the face images over areas where the subjects are not present. It is to be noted that the image editing unit 202 may incorporate face images in a manner other than that described above and it may instead incorporate a face image in response to instructions input to the image editing unit 202 via the operation unit (not shown) indicating "a particular subject for which a face image is to be generated", "a specific size at which the face image is to be generated" and "the specific position at which the face image is to be added".

Since face images of the subjects, the lines of sight of which are not directed toward the imaging device, can be incorporated into the image by the image editing unit 202, as shown in FIG. 7, the user of the image processing apparatus 200 is able to visually ascertain whether or not the line of sight of each subject in the captured image is directed toward the imaging device. When the captured image includes numerous subjects, in particular, the size of the face area of each subject may be rather small. Even under such circumstances, the user is able to determine with ease any subject, the line of sight of which is not directed toward the imaging device, by adopting the second example of image editing in the image editing unit 202.

As described above, the image processing apparatus 200 achieved in the second embodiment of the present invention includes the sightline detection unit 102 and the sightline indicating unit 104, as does the image processing apparatus 100 in the first embodiment and, as a result, the image processing apparatus 200 is able to visually indicate the line of sight of each subject clearly by detecting the lines of sight of individual subjects directed toward the imaging device in the captured image input to the sightline detection unit 102.

Since the results of the sightline affirmative/negative detection judgment can be clearly indicated in correspondence to each subject in the captured image via the image processing apparatus 200, the user of the image processing apparatus 200 is able to visually ascertain whether or not the line of sight of a given subject in the captured image is directed toward the imaging device.

If the captured image to undergo processing in the image processing apparatus 200 (i.e., the captured image input to the sightline detection unit 102) is a preview image, the user first visually ascertains whether or not the line of sight of the subject is directed toward the imaging device and then performs the actual photographing operation. Thus, the image processing apparatus, unlike an apparatus equipped with an imaging function in the related art, allows the user to obtain the desired image without missing the moment (the photo opportunity), in which the line of sight of the subject is directed toward the imaging device. In addition, the user taking a group photo such as that shown in FIG. 2 is able to visually confirm in the preview image whether or not the lines of sight of the subjects are directed toward the imaging unit 110 constituting the imaging device, as is the user of the image processing apparatus 100 achieved in the first embodiment. In other words, any subject, the line of sight of which is not directed toward the imaging device, can be easily ascertained.

Furthermore, the image processing apparatus 200 is able to automatically execute a photographing operation as the number of lines of sight directed toward the imaging device becomes equal to or greater than the predetermined value based upon the sightline detection results provided in correspondence to each subject by the sightline detection unit 102, as is the image processing apparatus 100 achieved in the first embodiment. The image processing apparatus 200, unlike an apparatus equipped with an imaging function in the related art, allows the user to obtain the desired image without missing the moment (the photo opportunity), in which the lines of sight of the subjects are directed toward the imaging device.

In addition, as in the case of the image processing apparatus 100 achieved in the first embodiment, the captured image processed in the image processing apparatus 200 does not need to be a preview image and instead, an image held in the storage unit 108 or an image input from an external apparatus other than the image processing apparatus 200 may be processed in the image processing apparatus 200 as the captured image. Thus, based upon the sightline detection results, the image processing apparatus 200 is able to select an image with the line of sight of the subject directed toward the apparatus equipped with the imaging function, from a plurality of still photographic images or a plurality of frames in a dynamic image.

The image processing apparatus 200 equipped with the image editing unit 202 is capable of executing image edit processing in order to generate a subject face image based upon the sightline detection results provided in correspondence to each subject by the sightline detection unit 102 or to incorporate the generated face image into the image having been marked by the sightline indicating unit 104. This allows the user to visually ascertain whether or not the line of sight of a given subject in the captured image is directed toward the imaging device.

While the image processing apparatus 200 has been described as the second embodiment of the present invention, the second embodiment of the present invention is not limited to the particular image processing apparatus, and it may be adopted in any type of apparatus equipped with an imaging function for capturing still images or dynamic images, including a digital camera, a digital video camera such as the "Handycam" the trademark rights to which are held by the applicant of the present invention, or a PHS (personal Handyphone system) with a digital camera function.

Program Achieved in the Second Embodiment

A program may be written to enable a computer to function as the image processing apparatus 200 in the second embodiment and based upon such a program, a subject, the line of sight of which is directed toward the imaging device and a subject, the line of sight of which is not directed toward the imaging device in the captured image can be clearly indicated.

Third Embodiment

The image processing apparatus 100 in the first embodiment assumes a structure in which an image marked by the sightline indicating unit 104 is displayed at the display unit 106 and/or is held in the storage unit 108. The image processing apparatus 200 achieved in the second embodiment, on the other hand, adopts a structure in which an image having undergone the image edit processing at the image editing unit 202 is displayed at the display unit 102 and/or is held in the storage unit 108. However, an image processing apparatus embodying the present invention may adopt a structure other than that in which an image is displayed at the display unit 106 and/or is held in the storage unit 108 and may, for instance, further include a communication unit by which an image with the lines of sight of the subjects therein clearly indicated is transmitted to an external apparatus.

The image processing apparatus achieved in the third embodiment, adopting the structure described above, too, is able to detect the line of sight of each subject in the captured image directed toward the imaging device and then clearly indicate the line of sight of each subject. Thus, the line of sight of a subject in the captured image directed toward the imaging device can be visually ascertained on the external apparatus side having received the image transmitted from the image processing apparatus achieved in the third embodiment. In addition, an image with a subject with the line of sight directed toward the apparatus with the imaging function can be selected from a plurality of still photographic images or from a plurality of frames in a dynamic image.

It is to be noted that while the communication unit in the image processing apparatus achieved in the third embodiment may be a terminal that achieves a physical connection with the external apparatus, e.g., a USB (Universal Serial Bus) terminal, an IEEE 1394 standard terminal or a LAN (local area network) terminal, or a unit engaged in communication with the external apparatus through wireless connection via a WUSB (wireless Universal Serial Bus), an IEEE 802.11 (also referred to as the "Wi-Fi") or the BluetoothR, it will be obvious that the communication unit may adopt a structure other than those described above.

Program Achieved in the Third Embodiment

A program may be written to enable a computer to function as the image processing apparatus in the third embodiment and based upon such a program, a subject, the line of sight of which is directed toward the imaging device and a subject, the line of sight of which is not directed toward the imaging device in the captured image can be clearly indicated.

Fourth Embodiment

While the image processing apparatuses achieved in the first through third embodiments each include an imaging unit, an image processing apparatus embodying the present invention is not limited to those with an imaging unit.

The image processing apparatus achieved in the fourth embodiment, too, is able to detect the line of sight of each subject directed toward the imaging device in the captured image and visually indicate the lines of sight of the individual subjects clearly. As a result, the user is able to visually ascertain whether or not the line of sight of a given subject in the captured image is directed toward the imaging device.

The image processing apparatus achieved in the fourth embodiment of the present invention may be adopted in information processing apparatuses such as PCs (personal computers) and PDA (personal digital assistant) units.

Program Achieved in the Fourth Embodiment

A program may be written to enable a computer to function as the image processing apparatus in the fourth embodiment and based upon such a program, a subject, the line of sight of which is directed toward the imaging device and a subject, the line of sight of which is not directed toward the imaging device in the captured image can be clearly indicated.

It will be understood by those skilled in the art that various modifications, combinations, sub-combinations and alterations may be made depending upon design requirements and other factors insofar as they are within the scope of the appended claims or equivalents thereof.

For instance, while the sightline indicating unit 104 and the image editing unit 202 in the image processing apparatus 200 achieved in the second embodiment shown in FIG. 5 are provided as separate units independent of each other, the image processing apparatus according to the present invention is not limited to this structural mode and the sightline indicating unit and the image editing unit in the image processing apparatus may be provided as an integrated unit. In addition, the image processing apparatus according to the present invention may be configured by replacing the marker generation unit 112 and the image synthesizing unit 114 in the sightline indicating unit 104 of the image processing apparatus 200 with the image editing unit 202. The image processing apparatus according to the present invention adopting this alternative structure, too, is able to indicate a subject with his line of sight directed toward the imaging device and a subject with his line of sight not directed toward the imaging device.

The structures described above simply represent examples embodying the present invention and are obviously within the technical range of the present invention.

What is claimed is:

1. An image processing apparatus that processes a captured image captured by an imaging device, the captured image depicting one or more subjects, the captured image having, for each of the one or more subjects, one or more white areas depicting whites of eyes of that subject and one or more iris areas depicting irises of the eyes of that subject, the apparatus comprising:
   a sightline detection unit that:
      calculates a ratio of the size of the white areas and the size of the iris areas for each of the one or more subjects, and
      based on the calculated ratio, detects whether a line of sight of each of the one or more subjects is directed toward the imaging device; and
   a sightline indicating unit that indicates, in correspondence to each of the one or more subjects, whether it has been detected that the line of sight of that subject is directed toward said imaging device, based upon sightline detection results provided by said sightline detection unit.

2. The image processing apparatus according to claim 1, further comprising:
   a display unit that displays the captured image with at least one indication of whether it has been detected that the line of sight of at least one of the one or more subjects is directed toward said imaging device, wherein the at least one indication is added to the captured image by said sightline indicating unit.

3. The image processing apparatus according to claim 1, further comprising:
   at least one storage medium that holds the captured image with at least one indication as to whether it has been detected that the line of sight of at least one of the one or more subjects is directed toward said imaging device, wherein the at least one indication is added to the captured image by said sightline indicating unit.

4. The image processing apparatus according to claim 1, wherein:
   said sightline detection unit detects a face area of each of the one or more subjects in the captured image, and detects the eyes of each of the one or more subjects based on the detected face area.

5. The image processing apparatus according to claim 4, wherein:
   said sightline indicating unit marks the face area of at least one of the one or more subjects for which it has been detected by said sightline detection unit that the line of sight of that subject is directed toward said imaging device.

6. The image processing apparatus according to claim 5, wherein:
   the sightline indicating unit marks the face area of the at least one of the one or more subjects for which it has been detected that the line of sight of that subject is directed toward said imaging device by adding a rectangular frame indicating the face area of that subject to the captured image.

7. The image processing apparatus according to claim 4, wherein:
   said sightline indicating unit marks the face area of at least one of the one or more subjects for which it has been detected by said sightline detection unit that the line of sight of that subject is not directed toward said imaging device.

8. The image processing apparatus according to claim 1, further comprising:
an imaging unit constituting said imaging device, wherein:
the captured image is a preview image captured via said imaging unit.

9. The image processing apparatus according to claim 8, wherein:
said imaging unit executes photographing operations if said sightline detection unit detects that a number of lines of sight equal to or greater than a predetermined value are directed toward said imaging device.

10. The image processing apparatus according to claim 1, further comprising:
at least one storage medium that holds an image having been previously captured by said imaging device, wherein:
the captured image is the image held in said storage medium.

11. The image processing apparatus according to claim 1, wherein:
the captured image is an image input from an external apparatus.

12. The image processing apparatus according to claim 4, further comprising a face image generation unit that adds to the captured image an enlarged copy of the face area of at least one of the one or more subjects for which it has been detected that the line of sight of that subject is not directed toward said imaging device.

13. The image processing apparatus according to claim 1, wherein the sightline detection unit adjusts a detection criterion for detecting whether a line of sight of a subject having a face is directed toward the imaging device based on a tilt of the subject's face.

14. An image processing method for processing a captured image captured by an imaging device, the captured image depicting one or more subjects, the captured image having, for each of the one or more subjects, one or more white areas depicting whites of eyes of that subject and one or more iris areas depicting irises of the eyes of that subject, the method comprising:
using an image processing device to:
calculate a ratio of the size of the white areas and the size of the iris areas for each of the one or more subjects;
detect whether a line of sight of each of the one or more subjects is directed toward the imaging device, based on the calculated ratio; and
indicate for each of the one or more subjects whether it has been detected that the line of sight of that subject is directed toward said imaging device.

15. At least one non-transitory computer-readable storage medium having encoded thereon computer-executable instructions enabling a computer to perform processing on a captured image captured by an imaging device, the captured image depicting one or more subjects, the captured image having, for each of the one or more subjects, one or more white areas depicting whites of eyes of that subject and one or more iris areas depicting irises of the eyes of that subject, the processing comprising:
calculating a ratio of the size of the white areas and the size of the iris areas for each of the one or more subjects;
detecting whether a line of sight of each of the one or more subjects is directed toward the imaging device, based on the calculated ratio; and
indicating, in correspondence to each of the one or more subjects, whether it has been detected that the line of sight of that subject is directed toward said imaging device.

* * * * *